United States Patent
Spector

(10) Patent No.: US 6,200,612 B1
(45) Date of Patent: Mar. 13, 2001

(54) CANDY-COATED RAISINS AND METHOD FOR PRODUCING SAME

(76) Inventor: Donald Spector, 380 Mountain Rd., Union City, NJ (US) 07087

( * ) Notice: Subject to any disclaimer, the term of this patent is extended or adjusted under 35 U.S.C. 154(b) by 650 days.

(21) Appl. No.: 08/574,279

(22) Filed: Dec. 18, 1995

(51) Int. Cl.7 ........................................ A23P 1/08
(52) U.S. Cl. ............................ 426/102; 426/99; 426/103; 426/639
(58) Field of Search ..................................... 426/102, 103, 426/99, 639

(56) References Cited

U.S. PATENT DOCUMENTS 3,554,767 * 1/1971 Daum et al. ........................... 426/102
5,558,890 * 9/1996 Brown et al. ........................... 426/94

OTHER PUBLICATIONS

Minifie, W. 1980, Chocolate, Cocoa, & Confectionery: Avi Publishing Co., Inc. Westport, CN, pp. 450 & 451.*

* cited by examiner

Primary Examiner—Helen Pratt

(57) ABSTRACT

A technique for applying to raisins a fat-free coating which not only enhances their nutritional value but also renders the raisins more palatable. In this technique raisins to be coated are deposited in a spinnable panning pot containing the hot liquid and dry ingredients which compose the coating. The pot is then spun until the liquid cools and hardens and there is then formed on the surfaces of the raisins a thin and brittle candy coating which when the raisins are masticated is crunched into small particles, the particles being intermingled with the flesh of the raisins to impart a crunchy sensation to the eating experience.

4 Claims, No Drawings

CANDY-COATED RAISINS AND METHOD FOR PRODUCING SAME

BACKGROUND OF INVENTION

1. Field of Invention

This invention relates generally to the production of candy-coated raisins, and more particularly to a technique for producing raisins having a fat-free candy coating which enhances the nutritional value of the raisins and renders them more palatable.

2. Status of Prior Art

A raisin is a dried fruit of certain variety of grapevines having a high sugar content and solid flesh. Raisins are nutritionally valuable, for they not only have a high natural sugar content, but also contain iron and other minerals as well and vitamins A and B. To convert the grapes into raisins, they must be dehydrated, usually by sun drying.

The production of raisins is limited to those regions such as in California having a long, hot growing season, for the grapes must remain on the vine until they are fully matured and attain a high percentage of sugar. Also enough time must elapse between the harvesting of the grapes and the fall rainy season to permit sun-drying.

Because it is a fruit, a raisin contains no fat, this being nutritionally desireable, for fat-laden foods are interdicted in many diets. Raisins, therefore, are a popular and healthy snack food. However, in some instances, raisins are provided with a chocolate or yogurt coating to add flavor thereto, for most children prefer candy-like snacks. Such raisin coatings have a high fat content and this is nutritionally undesireable. Moreover, chocolate or yogurt coated raisins have a dull appearance which is unappealing to consumers, for then the coated rasins look like amorphous droppings.

Candy-coated food products, before being coated, usually have oil applied to render the surface of the product receptive to the candy coating. This oil increases the fat content of the product.

Raisins, because of their fleshy interior, are chewy and do not crumble when engaged by the teeth. In the context of snack foods, this is a drawback, for with the more popular snack foods, the food product can be bitten into with the teeth and masticated.

Various psychological factors come into play in regard to the satisfaction one obtains in eating a food product that must be masticated so that it is crushed and ground in preparation for swallowing and digestion. This affords a greater degree of satisfaction than a product that requires little or no mastication.

Thus one could provide in a liquid form, a food product whose nutritional content is the same as a solid masticatable product. Yet the typical consumer would enjoy the solid food product far more than the equivalent liquid product which has only to be swallowed. Moreover, the process of mastication stimulates the flow of gastric juices to promote digestion.

Thus the most popular of Italian foods is pasta which when cooked in a conventional manner is soft and limp. The preferred technique for cooking pasta is to impart an "al dente" quality thereto, so that the cooked pasta is then somewhat resistant to the teeth to promote mastication.

SUMMARY OF INVENTION

In view of the foregoing, the main object of this invention is to provide raisins having a fat-free candy coating thereon which not only enhances the nutritional value of the raisins, but also renders them crunchy, and to a technique for producing these coated raisins.

More particularly, an object of this invention is to provide coated raisins of the above-type in which formed on the raisins is a thin, brittle candy coating that when the raisins are masticated, is crunched into small particles to impart a crunchy sensation thereto.

Yet another object of the invention is to provide candy-coated raisins on which the surface of the coating has a shine imparted thereto by an edible polishing agent so that the coated raisins are more appealing to consumers.

Briefly stated, in a technique in accordance with the invention, the raisins to be coated are deposited in a spinnable panning pot containing the heated liquid and dry ingredients composing the coating. The pot is then spun until the liquid cools and hardens and there is then formed on the raisins a thin and brittle candy coating. This candy coating, when the raisins are masticated, is crunched into small particles, the particles being intermingled with the flesh of the raisins to impart a crunchy sensation to the eating experience.

DESCRIPTION OF INVENTION

It is essential that a candy-coated raisin in accordance with the invention have a coating that is low in fat or substantially fat free.

In this way, the candy-coated raisin which is nutritionally valuable because of its sugar, mineral and vitamin content, will then have this value enhanced by the candy coating which in addition to sugar may also contain vitamins and minerals not found in the raisin.

A suitable low-fat or fat-free candy coating for the raisin may include such ingredients as dextrose, corn syrup, citric acid, and tapioca dextrin, as well as natural and artificial flavors, and nutritionally acceptable coloring agents to impart a yellow, a red, a blue or any other color to the coatings. Hence a box of candy coated raisins in accordance with the invention may be loaded with a variety of different color-coated raisins.

In a technique for producing candy-coated raisins, use is made for this purpose of a rotatable copper panning pot supported at about a 45 degree angle, and spinnable at a controllable speed.

The raisins to be coated are deposited in this pot and also the heated liquid and dry ingredients which compose the candy coating to be formed on the outer surface of the raisins. The pot is then spun until the liquid cools and hardens and one attains on the raisin a uniform solid candy coating which adheres to the skin of the raisins and is thin and brittle and therefore easily ruptured.

Then added to the panning pot is a small quantity of an edible polishing agent, such as carnuba wax, and the pot is again spun to cause the coated raisins to shine and thereby become more appealing, especially if the candy coating has a bright color.

When these candy-coated raisins are masticated, the chewy character of the flesh of the raisins is modified by the crunchy character of the brittle candy coating, for as one masticates these raisins, the candy coatings are then crunched into small particles that intermingle with the flesh of the raisins to impart a crunchy sensation to the eating experience.

It is to be noted that a sun-dried raisin has an amorphous shape and a highly irregular surface. Hence when this surface has a uniform candy coating applied thereto, the coating has a corresponding irregular surface. Consequently, when the coated raisin is eaten, the teeth fall into and are engaged by the irregularities of the coated surface, and there is no slippage as would be the case with a coated spherical surface. Thus raisins candy-coated in accordance with the invention become in effect "al dente" raisins and therefore more palatable. It is also to be noted that raisins have a microporous outer skin and this skin therefore need not have oil applied thereto in order for a candy coating to become bonded to the skin.

While there has been shown and described a preferred embodiment of candy-coated raisins, it will be appreciated that many changes and modifications may be made therein without, however, departing from the essential spirit of the invention. crunched into small particles that intermingle with the flesh of the raisins to impart a crunchy sensation to the eating experience.

It is to be noted that a sun-dried raisin has an amorphous shape and a highly irregular surface. Hence when this surface has a uniform candy coating applied thereto, the coating has a corresponding irregular surface. Consequently, when the coated raisin is eaten, the teeth fall into and are engaged by the irregularities of the coated surface, and there is no slippage as would be the case with a coated spherical surface. Thus raisins candy-coated in accordance with the invention become in effect "al dente" raisins and therefore more palatable. It is also to be noted that raisins have a microporous outer skin and this skin therefore need not have oil applied thereto in order for a candy coating to become bonded to the skin.

While there has been shown and described a preferred embodiment of candy-coated raisins, it will be appreciated that many changes and modifications may be made therein without, however, departing from the essential spirit of the invention.

These candy-coated raisins may be intermixed with the dry flakes of a cereal, such as a bran or corn based cereal to impart sweetness thereto. In many cereals particularly those intended for children, the flakes are candy-coated. This is nutritionally undesireable, for then the child's intake of sugar is excessive. But another drawback of candy-coating cereal flakes is that when milk or juice is added to the cereal as is the usual practice when a cereal is to be consumed, the liquid is absorbed by the candy-coating which renders the flakes soggy and unpalatable. However, by intermixing a relatively small amount of candy-coated raisins with a mass of cereal flakes, this serves to impart sweetness to the cereal without however rendering the flakes soggy and without providing the child with an excessive amount of sugar, particularly if the candy coating includes an artificial sweetener.

I claim:

1. A candy-coated raisin having "al dente" characteristics comprising a chewy, fat-free raisin formed from a dried grape having a fleshy interior containing natural sugar, minerals and vitamins, and a candy coating including sweetening agents formed on the exterior of the raisin and adhering thereto which is substantially fat free, the coating being thin and brittle whereby when the coated raisin is masticated, the coating is crunched into small particles which intermingle with the flesh of the raisin to impart a crunchy sensation to the eating experience, said candy-coated raisin being produced by depositing raisins to be coated and a heated liquid sweetening agent and dry ingredients which compose the coating in a spinnable panning pot, and spinning the pot until the liquid cools and hardens to form a thin, brittle and uniform solid candy coating on said raisin, said coating having a polishing agent applied to its surface to impart a shine thereto.

2. A candy-coated raisin as set forth in claim 1, in which the coating includes a coloring agent to impart a bright color in the raisin.

3. A candy-coated raisin as set forth in claim 1, in which the candy coating includes vitamins different from those included in the raisin.

4. A candy-coated raisin as set forth in claim 1, in which the candy coating includes minerals different from those in the raisin.

* * * * *